(12) United States Patent
Rowe (10) Patent No.: US 9,756,387 B2
(45) Date of Patent: Sep. 5, 2017

(54) SYSTEMS AND METHODS FOR USING A REMOTE CONTROL FOR PRESENCE DETECTION

(71) Applicant: Google Inc., Mountian View, CA (US)

(72) Inventor: Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 14/622,525

(22) Filed: Feb. 13, 2015

(65) Prior Publication Data

US 2016/0241910 A1    Aug. 18, 2016

(51) Int. Cl.

| H04H 60/32 | (2008.01) |
| H04N 21/442 | (2011.01) |
| H04N 21/466 | (2011.01) |
| H04N 21/41 | (2011.01) |
| H04N 21/658 | (2011.01) |
| H04N 21/8358 | (2011.01) |

(52) U.S. Cl.
CPC ... *H04N 21/44218* (2013.01); *H04N 21/4126* (2013.01); *H04N 21/44204* (2013.01); *H04N 21/4667* (2013.01); *H04N 21/6582* (2013.01); *H04N 21/8358* (2013.01)

(58) Field of Classification Search
USPC ...................................................... 725/9–12
See application file for complete search history.

(56) References Cited

U.S. PATENT DOCUMENTS

| 8,359,610 | B2 | 1/2013 | Falcon | |
| 8,856,816 | B2 | 10/2014 | Falcon | |
| 8,978,081 | B2* | 3/2015 | McClay | H04N 17/004 |
| | | | | 348/181 |
| 9,218,454 | B2* | 12/2015 | Kiani | G06F 19/327 |
| 2007/0011040 | A1* | 1/2007 | Wright | G06Q 30/02 |
| | | | | 725/46 |
| 2008/0141293 | A1* | 6/2008 | Blanchard | H04N 7/163 |
| | | | | 725/28 |
| 2009/0133051 | A1* | 5/2009 | Hildreth | H04N 5/4403 |
| | | | | 725/28 |
| 2009/0178081 | A1* | 7/2009 | Goldenberg | G06F 3/0482 |
| | | | | 725/46 |
| 2010/0148920 | A1 | 6/2010 | Philmon et al. | |

(Continued)

*Primary Examiner* — Mushfikh Alam
(74) *Attorney, Agent, or Firm* — Foley and Lardner LLP; John D. Lanza (57) ABSTRACT

The systems and methods discussed herein are directed to presence detection of portable devices of audience measurement panel members, and include a first audience measurement device in proximity to a media device, and a second audience measurement device in the form of a remote control for controlling the media device. The second audience measurement device may receive broadcast identification codes from the portable device of a panel member, and may transmit indicators of received signal strength to the first audience measurement device. The first audience measurement device may similar measure received broadcast signal strength from the portable device, and compare the local measurement and remote measurement to thresholds to determine whether the panel member's portable device is likely in proximity, and thus that the panel member is likely consuming media from the media device.

24 Claims, 6 Drawing Sheets

(56) References Cited

U.S. PATENT DOCUMENTS

| | | | |
|---|---|---|---|
| 2010/0153983 A1* | 6/2010 | Philmon | H04H 20/106 725/13 |
| 2010/0162285 A1* | 6/2010 | Cohen | H04H 60/31 725/12 |
| 2012/0240165 A1* | 9/2012 | Pan | H04N 21/25866 725/42 |
| 2013/0227595 A1 | 8/2013 | Nielsen et al. | |
| 2013/0262184 A1* | 10/2013 | Jain | G06Q 30/0205 705/7.34 |
| 2014/0057634 A1* | 2/2014 | Chang | H04W 36/32 455/437 |
| 2014/0181855 A1* | 6/2014 | Fife | H04N 21/25841 725/25 |
| 2014/0282641 A1* | 9/2014 | Fry | H04N 21/44218 725/10 |
| 2014/0302795 A1* | 10/2014 | Chacon | H04W 4/008 455/41.3 |
| 2014/0380383 A1* | 12/2014 | Blanchard | H04N 21/4104 725/86 |
| 2015/0189378 A1* | 7/2015 | Soundararajan | H04N 21/44222 725/12 |
| 2015/0237412 A1* | 8/2015 | Shimy | H04N 21/812 725/12 |
| 2015/0249512 A1* | 9/2015 | Adimatyam | H04H 60/29 725/107 |

* cited by examiner

| Received identifier 200 |
| --- |
| Received signal strength 202 |
| Positive or negative presence 204 |
| Timestamp 206 |
| Local identifier 208 |
| Associated media device 210 |

SYSTEMS AND METHODS FOR USING A REMOTE CONTROL FOR PRESENCE DETECTION

BACKGROUND

Audiences for content blocks, such as broadcast media or online streamed media, including commercial advertising, are typically measured via single-source data panels consisting of individuals or households recording content exposure over time. In one typical system, panel members record daily or weekly journals identifying watched content. However, if a panel member forgets that they watched an item of content, measurements may be inaccurate.

SUMMARY

Rather than requiring panel members to manually record journals, in some implementations of the systems and methods discussed herein, a measurement device may be installed proximate to a media device, such as a television, audio/video receiver, computer, or other such device capable of outputting received media. The measurement device may comprise a set-top box, smart television, computing device, or any other such device, and may record identifications of the output media. The identifications may be retrieved via metadata, embedded audio or video watermarks, closed captioning data, channel or station identifiers and timestamps, or any other such data. To determine that a panel member was present when the media content was output, panel members may be provided with or obtain portable or wearable devices that broadcast a signal, such as a Bluetooth Low Energy (BTLE) signal, Near-field Communication (NFC) signal, infrared signal, or any other type and form of signal detectable by the measurement device. When the measurement device determines that the portable device is physically present or within a predetermined range, based on a signal strength of the broadcast signal, the measurement device may infer that the panel member (wearing the portable device) is present while the media content is being output by the media device.

In many instances, multiple measurement devices may be in proximity and may all receive signals broadcast by a panel member's portable device. In one such instance, a first measurement device may be in a first room next to a first television, and a second measurement device may be a few feet away on the other side of a thin wall in a second room next to a second television. Depending on the type of signal broadcast by the portable device, both measurement devices may receive the signal and potentially identify the portable device as present. As the panel member may not be in both rooms simultaneously, such instances may result in false audience measurement data.

Accordingly, the systems and methods discussed herein provide a second measurement device in the form of a remote control associated with a media output device. The remote control may be in proximity to a panel member consuming media from the media output device, and may frequently be closer to the panel member's portable device than the second measurement device in another room, as discussed above. A strength of the signal broadcast by the panel member's device may be measured by the remote control to determine whether the device is proximate to the remote control. An identification of the measured strength may be provided to the measurement device, which may similarly measure the strength of the signal broadcast by the panel member's device. If both measurements exceed predetermined thresholds, then the measurement device may determine that the portable device (and, logically, the panel member) is present and consuming media output by the media device. In other implementations, measurement strengths from multiple portable devices and/or measurement devices may be compared, such as via statistical analysis (e.g. principal component analysis (PCA), linear discriminant analysis (LDA), or other such analysis methods), to identify a highest probability of presence or location correspondence between devices, even in instances where multiple measurements exceed a threshold.

One implementation disclosed herein is a remote control for audience presence detection. The remote control includes a wireless receiver configured to receive a broadcast signal from a portable device of an audience member; a signal analyzer configured to measure a strength of the broadcast signal of the portable device of the audience member; and a wireless transmitter configured to transmit, to a measurement device, an identification of the measured strength of the broadcast signal of the portable device of the audience member.

In some implementations, the remote control further includes a comparator configured to compare the measured strength of the broadcast signal of the portable device of the audience member to a threshold; and the wireless transmitter is configured to transmit the identification of the measured strength to the measurement device, responsive to the measured strength exceeding the threshold. In a further implementation, the identification of the measured strength comprises an identification of presence of the portable device.

In some implementations, the broadcast signal from the portable device of the audience member comprises an identifier of the portable device; and the wireless transmitter is further configured to transmit the identifier of the portable device to the measurement device. In other implementations, the wireless transmitter is further configured to transmit an identifier of the remote control to the measurement device. In many implementations, the remote control and the measurement device are both associated with a media device. The remote control may further comprise functionality for transmitting commands to control the media device.

Another implementation disclosed herein is a measurement device for audience presence detection. The measurement device includes a wireless receiver configured to receive a first signal from a portable device of an audience member, and a second signal from a remote control, the second signal comprising an identification of a strength of the first signal measured by the remote control; a signal analyzer configured to measure a strength of the received first signal and a strength of the received second signal; and a presence engine configured to identify the portable device as present, responsive to a determination that (i) a strength of the first signal exceeds a first threshold, (ii) a strength of the second signal exceeds a second threshold, and (iii) the identified strength of the first signal measured by the remote control exceeds a third threshold.

In some implementations of the measurement device, the signal analyzer further comprises a comparator for comparing (i) the strength of the first signal to the first threshold and (ii) the strength of the second signal to the second threshold. In other implementations of the measurement device, the identification of the strength of the first signal measured by the remote control comprises a positive presence identification. In still other implementations of the measurement device, the identification of the strength of the first signal measured by the remote control comprises a signal strength measurement value. In yet still other implementations of the measurement device, the signal analyzer may perform a statistical analysis (e.g. PCA, LDA, or a similar analysis method) on the first signal, the second signal, and/or one or more additional signals to identify a correlation between signal strengths, or a likelihood of colocation between signal sources, indicating presence of a remote control near a media device.

In one implementation, the measurement device includes a communications interface configured to transmit an identification of presence of the portable device to a measurement service, responsive to the identification of the portable device as present. In many implementations, the remote control and measurement device are both associated with a media device. In a further implementation, the measurement device includes a program detector configured to record an identification of an item of content output by the media device.

Another implementation disclosed herein is a method for audience presence detection. The method includes receiving, by a wireless receiver of a measurement device, a first signal from a portable device of an audience member, and a second signal from a remote control, the second signal comprising an identification of a strength of the first signal measured by the remote control. The method also includes measuring, by a signal analyzer of the measurement device, a strength of the received first signal and a strength of the received second signal. The method further includes identifying, by a presence engine of the measurement device, the portable device as present, responsive to a determination that (i) the strength of the first signal exceeds a first threshold, (ii) the strength of the second signal exceeds a second threshold, and (iii) the identified strength of the first signal measured by the remote control exceeds a third threshold.

In some implementations, the method includes comparing, by the signal analyzer, (i) the strength of the first signal to the first threshold and (ii) the strength of the second signal to the second threshold. In other implementations of the method, the identification of the strength of the first signal measured by the remote control comprises a positive presence identification. In still other implementations of the method, the identification of the strength of the first signal measured by the remote control comprises a signal strength measurement value.

In some implementations, the method includes transmitting, by a communications interface of the measurement device, an identification of presence of the portable device to a measurement service, responsive to the identification of the portable device as present. In many implementations of the method, the remote control and measurement device are both associated with a media device. In a further implementation, the method includes recording, by a program detector of the measurement device, an identification of an item of content output by the media device. In another implementation, the measurement device is associated with a media device in a first location, and the method includes receiving, by a wireless receiver of a second measurement device associated with a second media device in a second location, the first signal from the portable device of the audience member, and a third signal from a second remote control, the third signal comprising an identification of a strength of the first signal measured by the second remote control. The method also includes measuring, by a signal analyzer of the second measurement device, a strength of the received first signal at the second measurement device and a strength of the received third signal. The method also includes identifying, by a presence engine of the second measurement device, the portable device as not present at the second location, responsive to a determination that (i) the strength of the first signal at the second measurement device exceeds the first threshold, (ii) the strength of the third signal exceeds the second threshold, and (iii) the identified strength of the first signal measured by the second remote control does not exceed the third threshold.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Measurement of an audience of content, such as television programming, movies, commercial advertising, or any other type and form of content, may be useful for measuring audience size or popularity of content for pricing and holding advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, some audience measurement systems have used panels of participating individuals who agree to fill out surveys or diaries of content they've seen or listened to. However, this system relies on self-reporting, which may have decreased accuracy.

Rather than requiring panel members to manually record journals, in some implementations of the systems and methods discussed herein, a measurement device may be installed proximate to a media device, such as a television, audio/video receiver, computer, or other such device capable of outputting received media. The measurement device may comprise a set-top box, smart television, computing device, or any other such device, and may record identifications of the output media. The identifications may be retrieved via metadata, embedded audio or video watermarks, closed captioning data, channel or station identifiers and timestamps, or any other such data. To determine that a panel member was present when the media content was output, panel members may be provided with or obtain portable or wearable devices that broadcast a signal, such as a Bluetooth Low Energy (BTLE) signal, Near-field Communication (NFC) signal, infrared signal, or any other type and form of signal detectable by the measurement device. In some implementations, the signal may be an audio signal, such as an audible tone or dones or an inaudible signal such as an ultrasonic chirp capable of being detected by the devices. When the measurement device determines that the portable device is physically present or within a predetermined range, based on a signal strength of the broadcast signal, the measurement device may infer that the panel member (wearing the portable device) is present while the media content is being output by the media device. In other implementations, the measurement device may provide signal strength measurements or other such data to a measurement service, which may make the inference that the panel member (wearing the portable device) is present while the media content is being output by the media device.

Figure 1A:
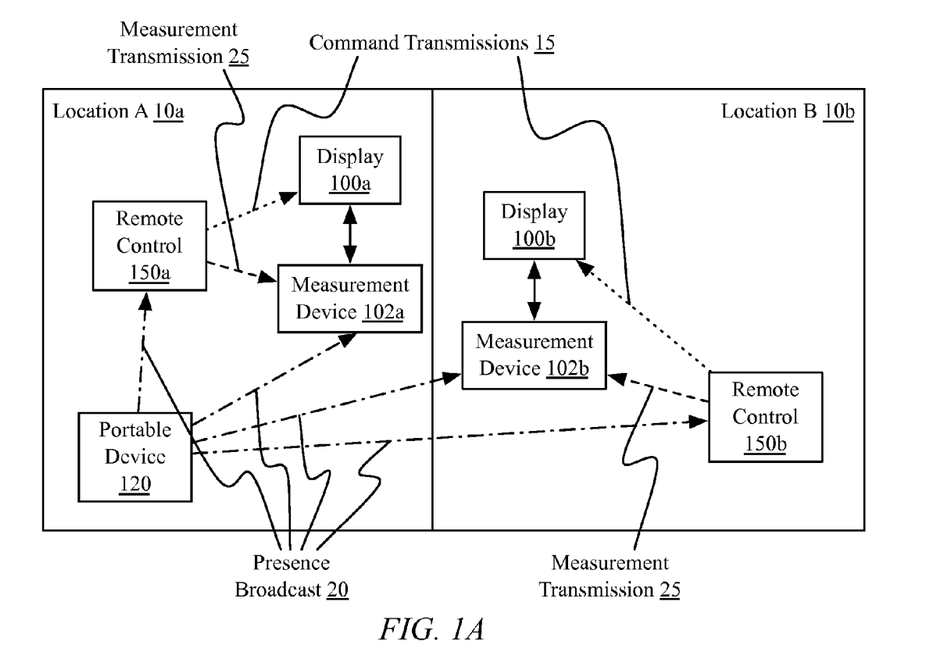
FIG. 1A is a diagram of devices in relative proximity to a portable device of a panel member, according to one implementation.

In many instances, multiple measurement devices may be in proximity and may all receive signals broadcast by a panel member's portable device. Referring first to FIG. 1A, illustrated is a diagram showing the relative positions of a portable device 120 in a first location A 10A; a first measurement device 102A in the first location 10A; and a second measurement device 102B in a second location B 10B. Locations A and B 10A-10B may be separate rooms within a building separated by a wall, or any other such separated areas. In some implementations, Locations A and B 10A-10B may be separate areas within a single large room, and may not be physically separate.

The first measurement device 102A may be associated with a first media device, e.g. display 100A; and the second measurement device 102B may be associated with a second media device, e.g. display 100B. Although shown as displays, in many implementations, a media device may comprise a computer, radio, audio/video receiver, amplifier, or other media output device.

As discussed above, a portable device 120 may broadcast a presence signal 20, sometimes referred to as a heartbeat signal, identification signal, or by similar terms. Portable device 120 may include an omni-directional antenna, and may accordingly broadcast the presence signal 20 to devices in a wide area. As shown, the first and second measurement devices 102A-102B may both receive the presence broadcast 20.

Figure 1B:
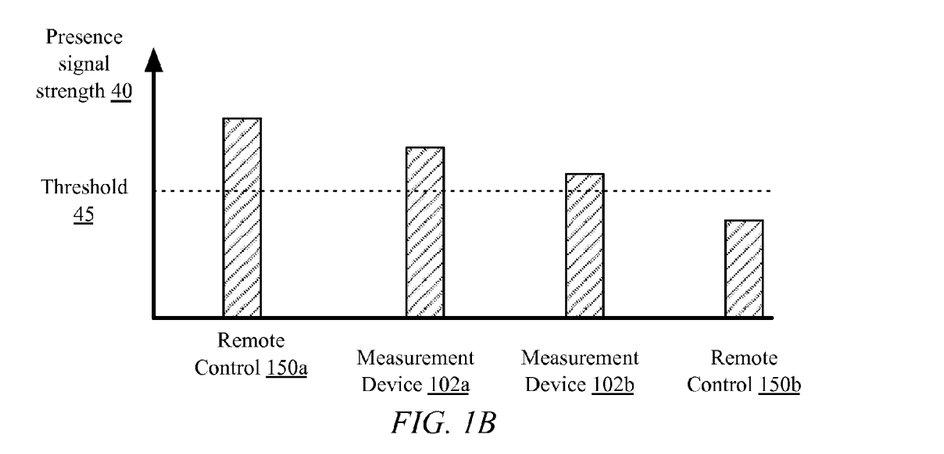
FIG. 1B is a bar graph of strengths of a signal broadcast by the portable device as received by the devices of FIG. 1A, according to one implementation.

Referring briefly to FIG. 1B, illustrated is a bar graph of strength 40 of the broadcast presence signal as received by the devices of FIG. 1A, including the first and second measurement devices 102A-102B. As shown, in many implementations, any wall between Location A and Location B 10A-10B (or other barrier between second measurement device 102B and portable device 120) may not significantly attenuate the strength 40 of the broadcast presence signal received by the second measurement device 102B (e.g. BTLE or WiFi signals may easily pass through a wood-framed drywall and plaster wall between two internal rooms in a residence). Similarly, as the strength of a broadcast signal is reduced by only 6 dB when the distance to a receiver is doubled (disregarding other attenuation), and the first and second measurement device 102A-102B may be within a few feet compared to a distance of ten or more feet to the portable device 120, the strength 40 of the broadcast presence signal received by the second measurement device 120B may not be significantly less than the strength 40 of the signal received by the first measurement device 120B.

Therefore, given a strength threshold 45 and relying solely on the strength 40 of the received broadcast signal, each measurement device 102A-102B may infer that the portable device 120 is present in the same location 10 as said measurement device 102.

Accordingly, the systems and methods discussed herein provide a second measurement device in the form of a remote control associated with a media output device. Returning to FIG. 1A, as shown, a remote control 150A may be in proximity to a panel member consuming media from a corresponding media output device 100A controlled by the remote control 150A (e.g. via command transmissions 15). The remote control 150A may frequently be closer to the panel member's portable device 120 than the second measurement device 102B in the second location 10B, as shown. A second remote control 150B corresponding to a second media output device 100B in the second location 10B may frequently be at least as far from the portable device 120 as the second measurement device 102B, and may be even farther away, as shown.

The remote control(s) 150 may receive the broadcast presence signal 20 from the portable device as shown. In some implementations, the remote control 150 may measure a strength of the signal and transmit the measurement to the measurement device 102 via measurement transmission 25. In other implementations, the remote control 150 may compare the measured strength to a threshold and identify presence of the portable device 120 in proximity to the remote control. The remote control 150 may transmit an identifier of the presence of the portable device to the measurement device 102A via measurement transmission 25.

Referring again to FIG. 1B, as shown, a signal strength 40 as measured by a first remote control 150A may exceed a threshold 45, while a signal strength 40 as measurement by a second remote control 150B may be less than the threshold 45. Accordingly, based on a combination of comparisons of the strength measurements of the remote control 150 and corresponding measurement device 102 to thresholds, the measurement device may determine whether the portable device 120 is within the same location as the measurement device (and the media output device 100).

In some instances, panel members may place a remote control 150 in proximity to a measurement device 102 when the remote control is not in use, such as placing a remote control next to a set-top box to prevent it from being lost in between couch cushions. In such instances, a signal strength measured by the measurement device 102 may be identical to or very similar to a signal strength measured by the remote control 150 (e.g. if remote control 150B of FIG. 1A were adjacent to measurement device 102B, then their corresponding signal strength bars 40 in FIG. 1B may be near identical). In one such implementation, if a difference between a signal strength measured by the remote control 150 and a signal strength measured by the measurement device 102 is not greater than a threshold, then the measurement device may determine that the remote control 150 is not in use, and may identify that the panel member is not present.

In another implementation, the measurement device 102 may receive signal strength measurements from a plurality of remote controls (e.g. remote controls 150A-150B). The measurement device 102 may select the highest measured signal strength reported by the remote controls 150, and may disregard the measurements of other remote controls. In a similar implementation, if the highest measured signal strength does not correspond to a remote control 150 associated with the same media output device 100 as the measurement device 102, the measurement device may determine that the panel member is not present (e.g. second measurement device 102B may receive signal strength measurements from both remote control 150A and remote control 150B; if the highest strength is measured by remote control 150A rather than remote control 150B, the second measurement device 102B may determine that the portable device is not in the same location 10B as display 100B, regardless of the strength measured by remote control 150B exceeding threshold 45).

As discussed above, presence broadcasts 20 may be of any type and form of signal, including BTLE, NFC, 802.11 (WiFi), infrared, ultrasonic, visible light, or audible or sub- or super-audible tones. Similarly, measurement transmissions 25 transmitted from remote controls 150 to measurement devices 102 may be of any type and form of signal, including BTLE, NFC, WiFi, infrared, ultrasonic, visible light, or audible or sub-or super-audible tones. In some implementations, measurement transmissions 25 may be of a type more likely to be attenuated by a wall, such as infrared or visible light, to reduce the likelihood that an unassociated measurement device 102 may receive the transmission 25. Similarly, command transmissions 15 from a remote control to a media device 100 may be of any type and form of signal, including BTLE, NFC, WiFi, ultrasonic, visible light, or audible or sub- or super-audible tones; in many implementations, the transmissions 15 may be via infrared for compatibility with existing media devices 100.

Figure 1C:
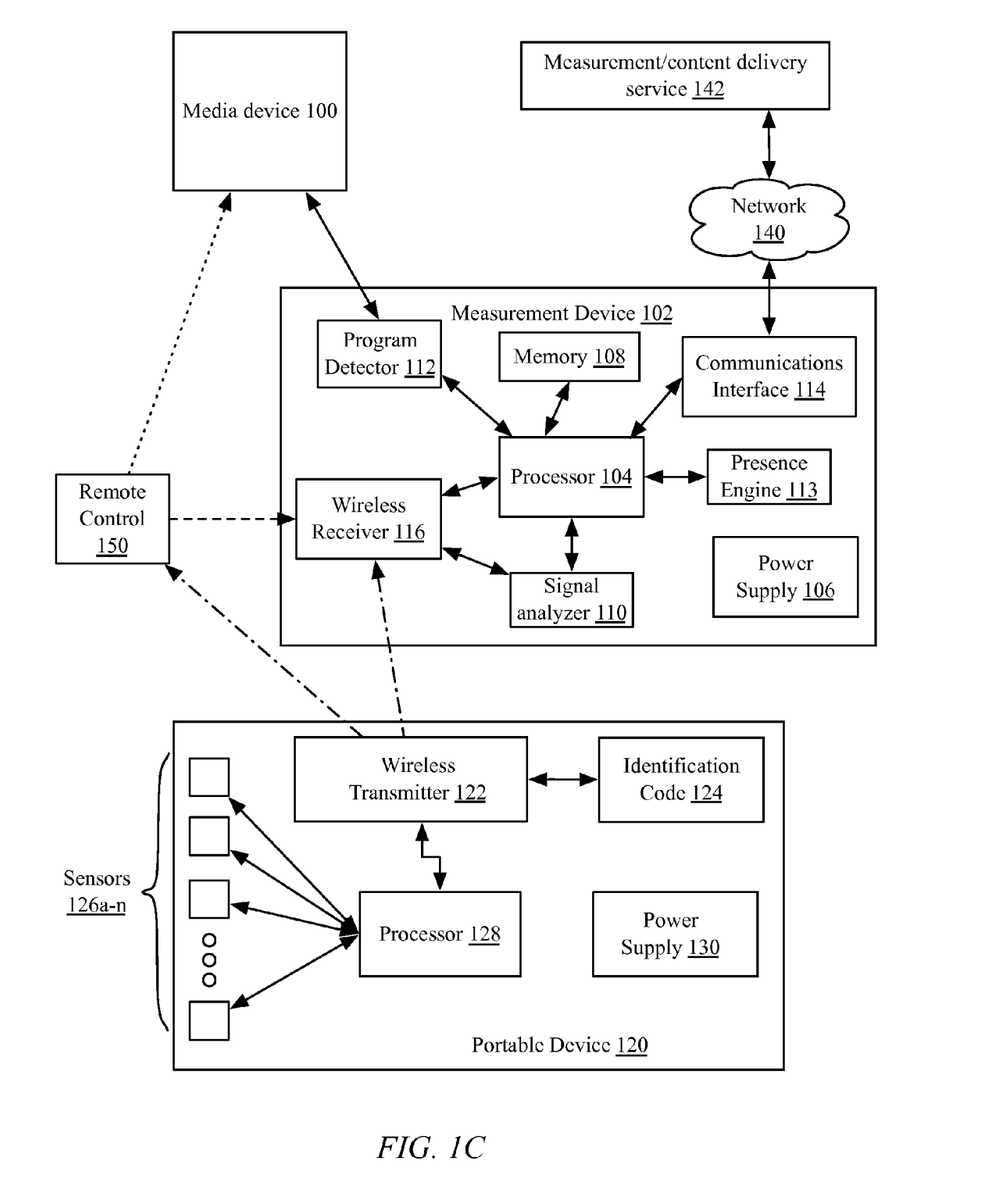
FIGS. 1C and 1D are block diagrams of devices of FIG. 1A, according to one implementation.
Figure 1D:
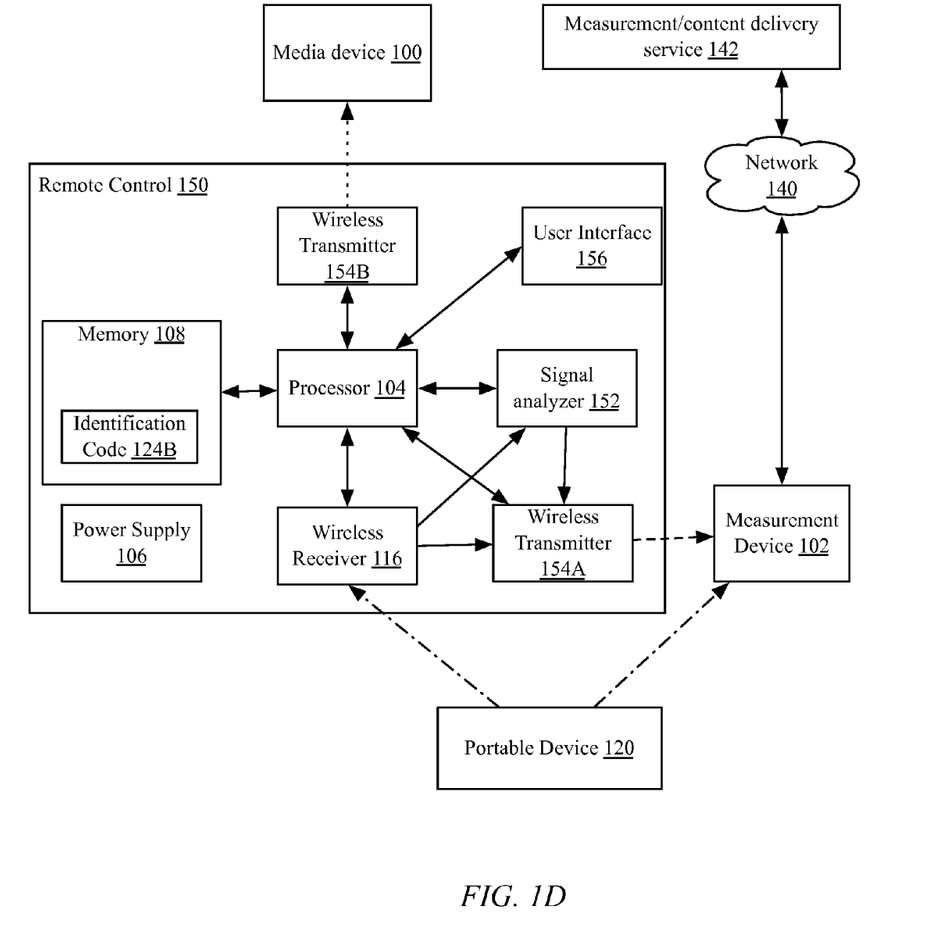

FIGS. 1C and 1D are block diagrams of devices and systems for presence detection, according to one implementation. Referring first to FIG. 1C, a measurement device 102 may be connected to a media device 100. Media device 100 may comprise a television, monitor, projection television, or any other type of visual display. In other implementations, media device 100 may comprise an audio output device, such as a radio, stereo system or other such device; accordingly, although primarily discussed in terms of visual presentations such as television shows or movies on a television screen, the systems and methods discussed herein may be readily applied to measurement and personalization of broadcast, streamed, or on-demand audio programming.

Measurement device 102 may comprise an electronic device integrated in a media device 100, or external to a media device 100 and in communication with the media device 100 or other device receiving and providing audio, visual, or multimedia content. Measurement device 102 may comprise a set-top box, a cable demodulator or cable box, a digital video recorder, a satellite receiver, a video game console, a computing device such as a desktop, laptop, or tablet computer, or any other type and form of device configured to detect an item of audio, visual, or multimedia content shown, played, or otherwise provided via a media device 100. In some implementations, a measurement device 102 may be part of the media device 100 or integrated with the media device 100, such as in a desktop, laptop, or tablet computer or a smart television. In other implementations, the measurement device 102 may be connected in serial or parallel to an input to the media device 100. In one implementation, a media device 100 may comprise a television with an HDMI input, and the measurement device 102 may comprise an HDMI input and HDMI output; the measurement device 102 may accordingly be connected as an intermediary device between the output of a source, such as a cable demodulator, audio/visual receiver, satellite receiver, or other device; and the input of the television. In other implementations, the measurement device 102 and media device 100 may be connected to outputs of a splitter or distribution amplifier, such that the devices 100, 102, receive the same output from a source. In still other implementations, as discussed above, the measurement device 102 may be integrated within a source, such as a set-top box.

In many implementations, a measurement device 102 may include a processor 104. Processor 104 may comprise any type and form of processing unit, including a microprocessor, application-specific integrated circuit (ASIC), FPGA, etc., or combinations of these or other processing units. In many implementations, processor 104 may be a multi-core processor or an array of processors. A measurement device 102 may also include memory 108, which may include, but is not limited to, electronic, optical, magnetic, or any other storage devices capable of providing processor 104 with program instructions. The memory 108 may include a floppy disk, CD-ROM, DVD, magnetic disk, memory chip, ROM, RAM, EEPROM, EPROM, flash memory, optical media, or any other suitable memory from which processor 104 can read instructions and, in some implementations, to which processor 104 can write measurement data for subsequent transmission via a communications interface 114. The instructions may include code from any suitable computer programming language such as, but not limited to, C, C++, C#, Java, JavaScript, Perl, HTML, XML, Python and Visual Basic.

In some implementations, a measurement device may include a power supply 106. Power supply 106 may comprise a battery, AC power supply, DC power supply, USB power supply, Power-over-Ethernet (PoE) power supply, inductive power supply, or any other type and form of power supply. Although illustrated internal to a measurement device 102, in many implementations, a power supply 106 may be external from device 102, such as an external AC-to-DC converter.

Measurement device 102 may communicate with an audience measurement service or content delivery service 142. Audience measurement service or content delivery service 142, referred to generally as measurement/content delivery service 142, may comprise one or more servers, including a server farm, cloud of virtual servers executed by one or more physical servers, a software-as-a-service (SaaS) or platform-as-a-service(PaaS), or other service. In some implementations, an audience measurement service 142 may communicate with an audience panel provider to identify panelists and provide measurement results. In other implementations, the content delivery service 142 may provide personalized recommendations to audience members based on their past explicitly identified and inferred viewing habits. Content delivery service 142 may comprise a streaming video or video-on-demand provider, a cable provider, a satellite provider, or other service provider.

The measurement device 102 may communicate with measurement/content delivery service 142 via a network 140. Network 140 may be any form of computer network or combinations of networks that relay information between one or more measurement devices 102 and one or more measurement and/or content delivery services 142, as well as other devices not illustrated. Network 140 may include the Internet and/or other types of data networks, such as a local area network (LAN), a wide area network (WAN), a cellular network, satellite network, or other types of data networks. Network 140 may also include any number of computing devices (e.g., computer, servers, routers, network switches, etc.) that are configured to receive and/or transmit data within network 140. Network 140 may further include any number of hardwired and/or wireless connections. A measurement device 102 may communicate wirelessly (e.g., via WiFi, cellular, radio, etc.) with a transceiver that is hardwired (e.g., via a fiber optic cable, a CAT5 cable, etc.) to other computing devices in network 140. In some implementations, a network 140 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.). In one such implementation, a measurement device 140 may capture and store measurement data for subsequent transfer to a computing device via a universal serial bus (USB) or similar interface to be transmitted by said computing device via a network 140.

A communication interface 114 may comprise any type and form of network interface, including a wired interface (e.g. Ethernet, including 10 Base T, 100 Base T, or 1000 Base T ("Gigabit")), a wireless interface (e.g. 802.11a, 802.11b, 802.11g, 802.11n, 802.11.ac, Bluetooth, BTLE, NFC), a cellular interface, or any other type of interface for transmitting data over a network. In some implementations, network interface 114 may comprise a parallel or serial interface, such as a USB interface, an IEEE 1394 (Firewire) interface, an RS-232 interface, an RS-485 interface, or any other type and form of interface to another computing device. In many implementations, a second computing device may serve as an intermediary for communications to an audience measurement server. In one such implementation, a capture device may communicate via a USB interface with a desktop computer, which may transmit captured closed captioning data via an Ethernet interface to a network gateway or switch connected to the Internet for transmission to an audience measurement server. In some implementations, the measurement device 102 may store data in a memory 108, for subsequent synchronization or transfer via a computing device connected to a network 140.

A measurement device 102 may, in some implementations, comprise a program detector 112. Program detector 112 may comprise hardware, software, or any combination of hardware and software for identifying content displayed on a media device 100. In some implementations, program detector 112 may identify a channel selected for display on media device 100 and retrieve an identification of content based on a current time and date; in other implementations, program detector 112 may simply identify the channel, time, and date and may transmit this information to a measurement service 142 for subsequent identification of content. In other implementations, program detector 112 may identify content based on metadata of the content (e.g. video-on-demand file names or content identifiers), based on closed captioning data included with the content, embedded audio watermarks in the data, radio broadcast data system (RBDS) or radio data system (RDS) data, or any other such data.

Measurement device 102 may also include a wireless receiver 116. Wireless receiver 116 may comprise a WiFi transmitter and/or receiver; a BTLE transmitter and/or receiver; a NFC transmitter and/or receiver; a wireless universal serial bus (Wireless USB) transmitter and/or receiver; or any other type of wireless data transmitter and/or receiver. In some implementations, wireless receiver 116 may comprise an optical transmitter and/or receiver or an infrared transmitter and/or receiver. In other implementations, wireless receiver 116 may comprise an ultrasonic transmitter and/or receiver. Wireless receiver 116 may receive identification codes 124 from one or more portable devices 120 within range (e.g. within viewing or listening range of a media device 100, such as within a living room). In some implementations, wireless receiver 116 may comprise a transmitter or beacon that may transmit periodic requests for portable devices 120 to transmit identification codes 124. This may be used to reduce power consumption by the portable devices 120, by allowing the device to stay in a passive, receive-only low power state until receiving a request for an identification code from the measurement device 102. In some implementations, wireless receiver 116 may also receive identification codes, positive or negative presence identifiers, and/or remote signal strength measurements from one or more remote controls 150. In other implementations, a first wireless receiver 116 may receive broadcast transmissions from portable devices 120, and a second wireless receiver 116' (not illustrated) may receive transmissions from one or more remote controls 150. As discussed above, such second wireless receivers 116' need not be of the same type as first wireless receivers 116.

In some embodiments, measurement device 102 may include a signal analyzer 110. Signal analyzer 110 may comprise hardware, software, or a combination of hardware and software for measuring strength of a received broadcast signal and/or comparing the measured strength to a threshold. In one implementation, signal analyzer 110 may comprise an analog circuit, such as a comparator with an input reference voltage set to a predetermined threshold. In another implementation, signal analyzer 110 may comprise software stored in memory 108 and executed by a processor 104 to receive a measured signal strength from a wireless receiver 116 and compare the strength value to a threshold.

Measurement device 102 may include a presence engine 113. Presence engine 113 may be an application, service, daemon, server, routine, or other executable logic for determining, based on a plurality of signal strength measurements of the measurement device 102 and one or more remote controls 150, whether a portable device 120 is present in a location proximate to a media device 100 (such that a panel member associated with the portable device 120 is likely consuming media output by the media device 100). Although shown separate from memory 108, in many implementations, presence engine 113 may be stored in memory 108 and executed by processor 104. In other implementations, presence engine 113 may be executed by another computing device, such as measurement/content delivery service 142. As discussed above, presence engine 113 may receive the results of signal strength measurements and/or strength-threshold comparisons by a signal analyzer 110 or wireless receiver 116, and may determine based on a logical conjunction of a plurality of comparisons whether the portable device 120 is present.

Portable device 120 may comprise any type and form of device that may be worn or carried by a panel participant. In some implementations, portable device 120 may comprise a wristband, wristwatch, ring, necklace, glasses, or other such wearable device. In many implementations, a portable device 120 may be a soft wristband, made of silicone or a similar material, and including a small power supply 130, wireless transmitter 122 such as a BTLE beacon and antenna. In other implementations, portable device 120 may comprise a smart phone. Each panel participant may have a portable device 120 that may be associated with the panel participant via an identification code 124. The identification code 124 may be transmitted to measurement device 102 to identify whether the portable device 120, and accordingly the panel participant, is within viewing or listening range of an item of content on media device 100.

As discussed above, portable device 120 may comprise a wireless transmitter 122. Wireless transmitter 122 may comprise a WiFi transmitter and/or receiver; a BTLE transmitter and/or receiver; an NFC transmitter and/or receiver; a Wireless USB transmitter and/or receiver; or any other type of wireless data transmitter and/or receiver, corresponding to wireless receiver 116. As discussed above, although described in terms of receiver 116 and transmitter 122, in many implementations, measurement device 102 may transmit a request for an identification code 124 which may be received by portable device 120, prior to portable device 120 transmitting the code 124 to the measurement device 102. In other implementations, wireless transmitter 122 may not include a receiver, and may simply periodically transmit the identification code 124, such as once per second, once per ten seconds, once per minute, or at any other such interval. Such transmissions may be in accordance with any suitable protocol for transmission via the hardware, and may include collision avoidance, time slice negotiation, handshaking, or any other such features. In other implementations, such as where portable device 120 is a smart phone or other such device, wireless transmitter 122 may comprise a WiFi network interface or similar network interface for connecting to a network provided by measurement device 102. Measurement device 102 may comprise an 802.11g WiFi base station or gateway. In a further such implementation, in which such networks may have a larger range than watching or listening range for media device 100 (e.g. an 802.11n WiFi network with a range covering an entire house), measurement device 102 may determine that a portable device 120 is within range based on wireless signal strength being above a threshold.

Identification code 124, sometimes referred to as a device identifier, user identifier, panel participant identifier, or by any other similar name, may comprise any type and form of identification code, set to be unique for each panel participant, either globally, within a region, or within a household. In some such implementations in which shorter codes 124 are used for household members, a household identification code may be stored by measurement device 102 and may be transmitted to a measurement/content delivery service 142 along with one or more participant identification codes 124. Accordingly, identification code 124 may comprise a binary or alphanumeric string of any suitable length, such as four bits, eight bits, sixty-four bits, or any other such value. In other implementations, identification code 124 may comprise a frequency offset of a wireless transmitter 122. Each panel participant in a household may have a portable device 120 broadcasting a signal at different frequencies offset from a base carrier frequency. The measurement device 102 may detect the broadcast signals and determine which panel participant(s) are present by detecting the various signal frequencies.

In some implementations, portable device 120 may comprise a processor 128, similar to any of the processors 104 discussed above. Processor 128 may comprise a powerful processor for some implementations of portable devices 120 such as a smart phone, or may be a very simple and low power processor for other implementations, such as a wearable BTLE presence band or NFC token. Processor 128 may control various functions of the portable device 120, including timing of intervals for transmission of identification codes 124, receiving and responding to requests for codes from a measurement device 102, performing negotiation or collision avoidance algorithms, etc.

In some implementations, portable device 120 may comprise one or more sensors 126*a-n*, referred to generally as sensor(s) 126. Sensors 126 may be used to determine that the portable device 120 is being worn or carried, as opposed to sitting on a table or otherwise unused by a panel provider. Sensors 126 may comprise temperature sensors to detect the warmth of the user above ambient temperature of the room, accelerometers to detect motion of the sensor to indicate that it is being worn, resistive or capacitive sensors to detect contact with the user, or any other type and form of sensor. In some implementations, sensors 126 may be used to provide data to the user, such as via a display (not illustrated). A portable device 120 may include a heart rate sensor to detect that the device 120 is being worn by the user, and may also provide the heart rate to the user for exercising or fitness purposes. Such features may further encourage the user to wear the device 120 more frequently.

Portable device 120 may include a power supply 130. Power supply 130 may comprise a battery, such a Lithium-ion (Li-ion) or Nickel-Cadmium (Ni-Cad) battery or any other type and form of battery. Such batteries may be rechargeable or non-rechargeable, and may be user replaceable or non-user replaceable. In some implementations, power supply 130 may include inductive charging components, such as antennas and rectifiers, while in other implementations, power supply 130 may include a power input port, such as a micro-USB port, AC or DC plug, or any other type and form of charging port. In still other implementations, such as in very low power implementations of portable devices 120, power supply 130 may include mechanical charging systems, such as weights or springs that capture force during ordinary motion of the wearer and convert said force to electrical energy.

As shown and as discussed above, identification code or presence broadcasts by wireless transmitter 122 may be received both by wireless receiver 116 of measurement device 102 and by one or more remote controls 150. FIG. 1D illustrates components of one implementation of a remote control 150. As shown, in many implementations, a remote control may include a processor 104, power supply 106, and/or memory 108, said components similar to those discussed above in connection with a measurement device 102. In other implementations, the remote control may include a simpler processor 104 than that required by a measurement device 102, such as an FPGA or ASIC. Similarly, the remote control may include a simpler memory 108, such as a ROM, PROM, or EPROM, and may not need the ability to store data for more than a short time. In many implementations, power supply 106 of a remote control 150 may be a battery, allowing portable use of the remote control.

Remote control 150 may include a wireless receiver 116 for receiving broadcast identification codes and/or presence signals from a portable device 120. Wireless receiver 116 of a remote control 150 may be similar to a wireless receiver 116 of a measurement device 102, as discussed above.

A remote control 150 may include a signal analyzer 152. Signal analyzer 152 may comprise hardware, software, or a combination of hardware and software for measuring strength of a received broadcast signal and/or comparing the measured strength to a threshold. In one implementation, signal analyzer 152 may comprise an analog circuit, such as a comparator with an input reference voltage set to a predetermined threshold. In another implementation, signal analyzer 152 may comprise software stored in memory 108 and executed by a processor 104 to receive a measured signal strength from a wireless receiver 116 and compare the strength value to a threshold. In some implementations, signal analyzer 152 may perform signal strength measurements and comparisons, and the remote control 150 may transmit the comparison result or a positive or negative presence indicator to a measurement device 102. In other implementations, the remote control 150 may transmit the signal strength measurement to the measurement device 102 directly. In a further implementation, as discussed above, signal strength measurements may be performed by the wireless receiver 116; accordingly, in such implementations, the remote control 150 need not include a signal analyzer 152.

Remote control 150 may include a wireless transmitter 154A for transmitting received broadcast signal strength measurements, received broadcast identification codes, and/or positive or negative presence indicators to one or more measurement devices 102. Wireless transmitter 154A may be any type and form of transmitter, including a WiFi transmitter; a BTLE transmitter; an NFC transmitter; a Wireless USB transmitter; an optical transmitter; an infrared transmitter; an audio transmitter; or any other type of wireless data transmitter, corresponding to a wireless receiver in a measurement device 102. As discussed above, in some implementations, wireless transmitter 154A may be of a different type than wireless receiver 116. In other implementations, wireless transmitter 154A and wireless receiver 116 may be integrated or share antennas, amplifiers, or other components.

In some implementations, remote control 150 may include an identification code 124B. Similar to an identification code 124 of a portable device, an identification code 124B, sometimes referred to as a device identifier, may comprise any type and form of identification code, set to be unique for each remote control, either globally, within a region, or within a household. Identification code 124B may comprise a binary or alphanumeric string of any suitable length, such as four bits, eight bits, sixty-four bits, or any other such value; a frequency offset of a wireless transmitter 154A; or any other such identifier. In implementations in which transmissions from a remote control 150 may be received by a plurality of measurement devices 102 and/or in which a measurement device 102 may receive transmissions from a plurality of remote controls 150, each remote control 150 may transmit its identification code 124B to the measurement devices 102 along with received portable device identifiers, signal strength measurements, and/or presence identifiers, to identify which remote control 150 performed which measurement.

In some implementations, remote control 150 may include a second wireless transmitter 154B for transmitting commands to a media device 100. In many implementations, wireless transmitter 154B may be an infrared transmitter for compatibility with infrared receivers of existing media devices 100. In other implementations, wireless transmitter 154B may be a Bluetooth transmitter, Wireless USB transmitter, WiFi transmitter, or any other type and form of transmitter. In some implementations, wireless transmitter 154B may share components (e.g. antennas, amplifiers, etc.) with wireless transmitter 154A and/or wireless receiver 116.

Remote control 150 may include a user interface 156. User interface 156 may include one or more input devices, such as physical buttons, dials, or switches; virtual or "soft" buttons, dials, or switches presented on a display such as an LCD touchscreen; microphones or cameras. User interface 156 may also include one or more output devices, such as an LCD screen, LEDs, or speakers. User interface 156 may provide an interface for an audience member to control a media device 100, including changing channels or inputs, controlling volume, controlling various digital video recorder features, or any other such features.

Figure 2:
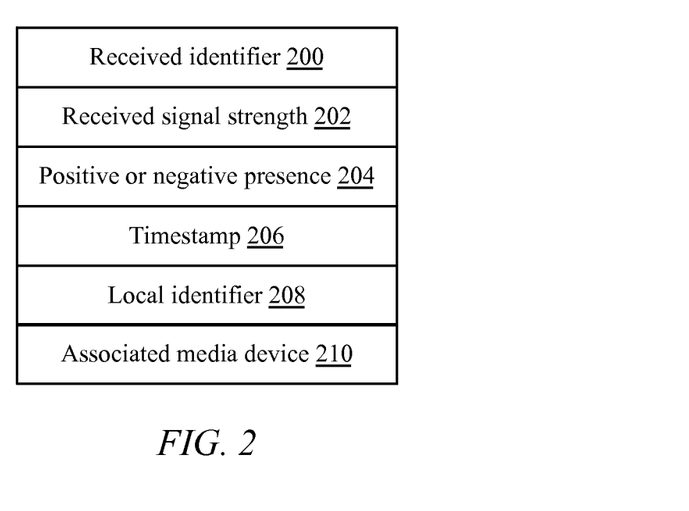
FIG. 2 is a diagram of a remote signal strength measurement record, according to one implementation.

As discussed above, a remote control 150 may receive broadcast identifiers from a portable device 120 of a panel member, may measure the signal strength of the broadcast and, in some implementations, may indicate a positive or negative presence of the portable device responsive to the measured signal strength exceeding a threshold. The remote control 150 may transmit these values and/or identifiers to a measurement device in a measurement record, one implementation of which is shown in FIG. 2. The measurement record may be transmitted as a serial string of data in binary, alphanumeric, or any other format. In some implementations, the measurement record may be transmitted as a packet, such as an application layer packet; may be transmitted as a string of parameter-value pairs in a representational state transfer (RESTful) request; may be transmitted as an extensible markup language (XML) payload; or as any other type and form of data. In some implementations, the measurement record may be transmitted in options fields of a packet header, such as transport or network layer header options. In other implementations, the measurement record may be transmitted as a series of pulses, such as pulses of an infrared LED.

A measurement record may include a received identifier 200 of a portable device, such as an identification code 124. As discussed above, in many implementations, a portable device 120 may broadcast its identification code 124. The remote control 150 may receive the broadcast and include the received code 124 as the received identifier 200 of the measurement record to be transmitted.

In some implementations, the measurement record may include a received signal strength measurement 202. Signal strength may be measured and represented in dBmV/m, dBµV/m, dBm, as a value between 0-100, or any other such representation. In other implementations, the measurement record may include a positive or negative presence indicator 204. The presence indicator may be a flag or bit set to a predetermined value to indicate a positive presence or negative presence of the portable device, based on comparison of a received signal strength to a threshold by the remote control. In some implementations, a measurement record may include both a received signal strength value 202 and a presence indicator 204.

The measurement record may also include a timestamp 206. Timestamp 206 may be in absolute time or relative time, such as a time in milliseconds prior to transmission of the measurement record at which the identifier was received by the remote control from the portable device. Inclusion of the timestamp 206 may aid in synchronizing signal strength measurements by the remote control and measurement device, or otherwise ensuring that the same broadcast signal is being measured by both devices.

As discussed above, in some implementations, a measurement device may receive measurement records from multiple remote controls. Accordingly, in such implementations, a measurement record may include a local identifier 208 or identifier 124B of the remote control, and/or an identifier 210 of the media device 100 associated with the remote control. The measurement device may then disregard measurements received from remote controls associated with different media devices, and/or determine the location of the portable device more accurately based on the received records.

Figure 3A:
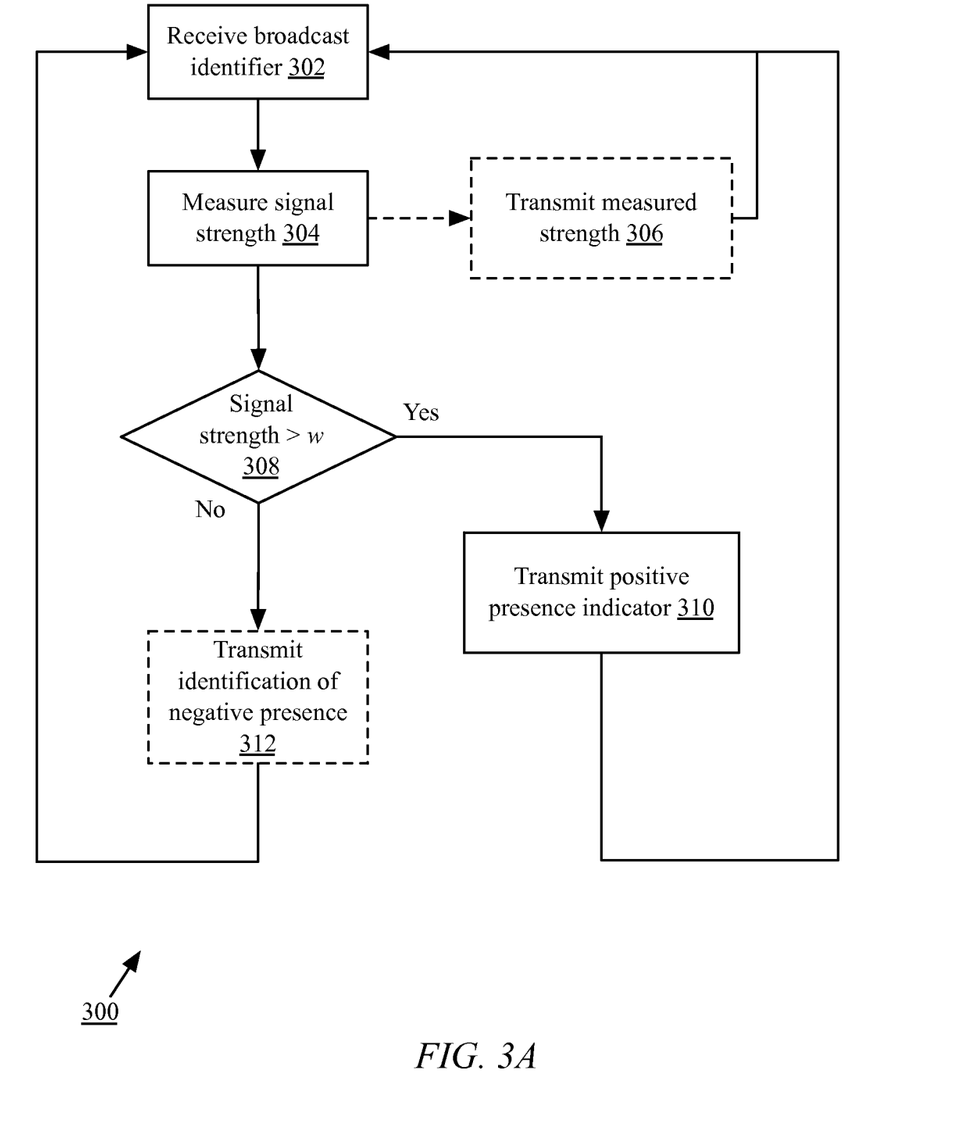
FIG. 3A is a flow diagram of the steps taken in one implementation of a process for remote presence signal detection, according to one implementation.

FIG. 3A is a flow diagram of the steps taken in one implementation of a process 400 for presence detection by a remote control. At step 302, the remote control may receive a broadcast identifier from a portable device of a panel member. The broadcast identifier may comprise a heartbeat signal, an identification code, or any other such data. In some implementations, the broadcast identifier may be transmitted periodically, while in other implementations, the broadcast identifier may be transmitted in response to a query by an audience measurement device. Such queries may be transmitted periodically, or responsive to program or content changes of media output by a media device.

At step 304, the remote control may measure the signal strength of the received broadcast identifier. The signal strength may be measured by a wireless receiver and/or signal analyzer of the remote control, as discussed above.

At step 306, in some implementations, the remote control may transmit the measured signal strength to a measurement device. The signal strength measurement may be transmitted in a measurement record, as discussed above in connection with FIG. 2, or otherwise, such as a stream of signal strength values. The record may include the received identifier, a timestamp, a local identifier of the remote control, an associated media device identifier, and/or any other such data. In some implementations, no internal comparisons may be performed by the remote control, and accordingly, the method may repeat steps 302-306 and skip steps 308-312.

In other implementations, at step 308, the remote control may compare the measured signal strength to a threshold w. The threshold may be predetermined, or may be configured by a user or administrator of the system. The threshold may be set such that a portable device must be within a few feet of the remote control for its broadcast signal strength to exceed the threshold. The threshold may be set based on the size of the room in which the media device is placed.

If the signal strength is greater than the threshold w, then at step 310, the remote control may transmit a positive presence indicator to an audience measurement device. The positive presence indicator may comprise a flag or bit set to a predetermined value, and may be transmitted as part of a measurement record as discussed above.

If the signal strength is less than the threshold w, then at step 312, in some implementations, the remote control may transmit a negative presence indicator to the measurement device. This may be done to increase accuracy of presence detection. In other implementations, the remote control may not transmit negative indicators, and step 312 may be skipped.

Figure 3B:
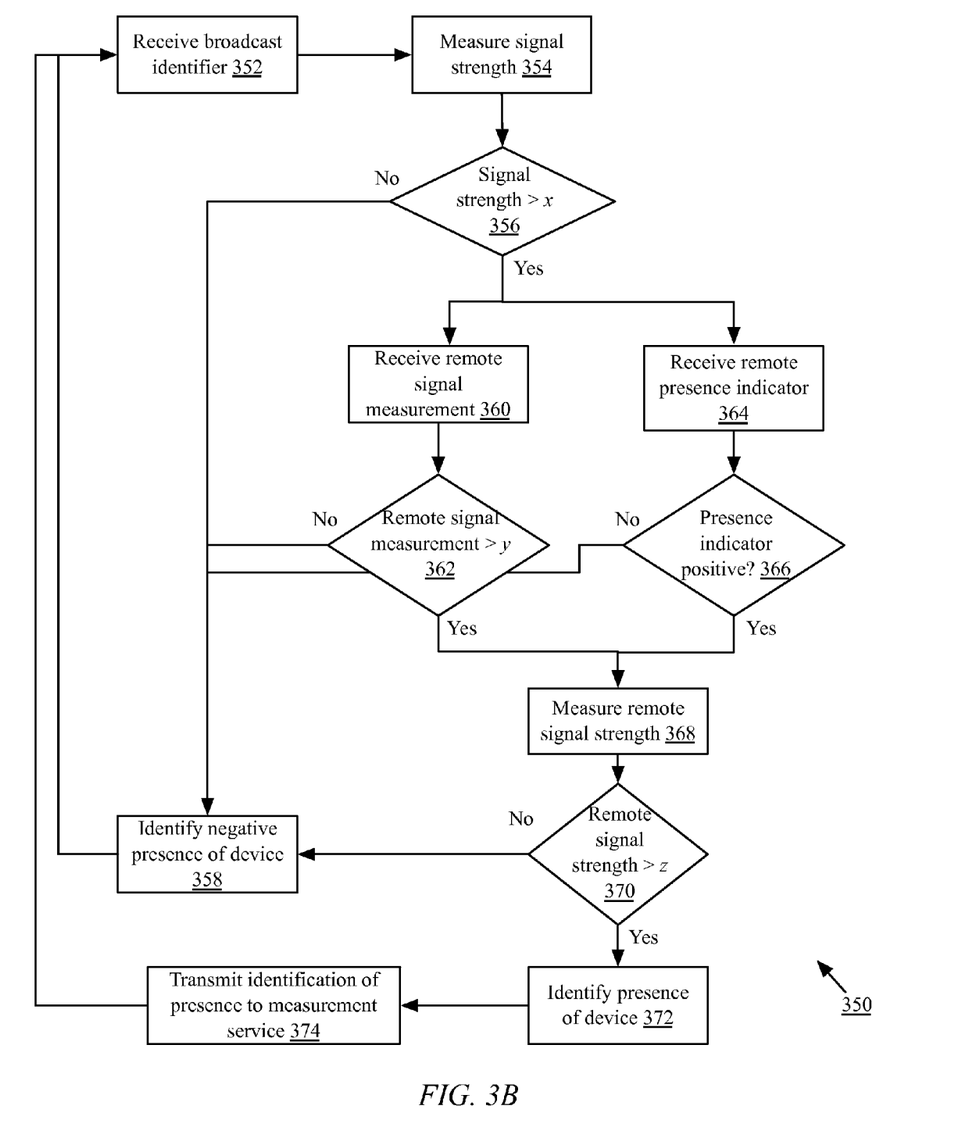
FIG. 3B is a flow diagram of the steps taken in one implementation of a process for audience presence detection, according to one implementation.

FIG. 3B is a flow chart depicting an implementation of a method 350 for presence detection by an audience measurement device. At step 352, the audience measurement device may receive a broadcast identifier from a portable device of a panel member. As discussed above, the broadcast identifier may comprise a heartbeat signal, an identification code, or any other such data. In some implementations, the broadcast identifier may be transmitted periodically, while in other implementations, the broadcast identifier may be transmitted in response to a query by the audience measurement device and/or the remote control. Such queries may be transmitted periodically, or responsive to program or content changes of media output by a media device. In one implementation, the audience measurement device may monitor content displayed or output by the media device, via metadata, closed caption information, embedded audio or video watermarks, or other such information, and upon receiving information indicating the start of a new program or program segment (e.g. commercial break, segment of a show, etc.), may broadcast a query to trigger any portable device receiving the query to respond with a broadcast of its identification code.

At step 354, the audience measurement device may measure the strength of the received broadcast identifier from the portable device. The signal strength may be measured by a wireless receiver and/or signal analyzer of the audience measurement device, as discussed above. At step 356, a signal analyzer of the measurement device may determine whether the measured signal strength is above a threshold x. If not, then at step 358, the measurement device may determine that the portable device is likely not in the same location as the measurement device and corresponding media device, and infer that the panel member is not presently in the audience or consuming media from the media device.

If the measured signal strength is above threshold x, then in some implementations, at step 360, the measurement device may receive a remote signal strength measurement from a remote control (the measurement device may also receive remote signal strength measurements at step 356 or step 358; however, if the locally measured signal strength is below threshold x, then in many implementations, remote signal strength measurements may be disregarded). The remote signal strength measurement may be received in a measurement record as discussed above in connection with FIG. 2, as a serial stream of data, as a parameter-value pair in a packet, as a value in a header of a packet (e.g. options field, sequence number, or elsewhere), or otherwise. At step 362, the audience measurement device may determine whether the received remote signal strength measurement is above a second threshold y. If not, then at step 358, the measurement device may determine that the portable device is likely not in the same location as the measurement device and corresponding media device, and infer that the panel member is not presently in the audience or consuming media from the media device.

In a similar implementation, as discussed above, the remote control may make signal strength measurements and comparisons on its own, and may transmit a positive (or negative, in some implementations) remote presence indicator to the audience measurement device, in addition to or instead of transmitting the remote signal strength measurement. Such presence indicator may be received by the audience measurement device at step 364 (as discussed above, the measurement device may also receive remote presence indicators at step 356 or step 358; however, if the locally measured signal strength is below threshold x, then in many implementations, remote presence indicators may be disregarded). At step 366, in implementations in which the remote control may transmit negative presence indicators, the audience measurement device may determine whether the received indicator is positive or negative. If the indicator is negative, then at step 358, the measurement device may determine that the portable device is likely not in the same location as the measurement device and corresponding media device, and infer that the panel member is not presently in the audience or consuming media from the media device. In other implementations in which the remote control may not transmit negative presence indicators, step 366 may be skipped, as any received indicator is positive.

If the measured signal strength is above threshold y at step 362; or if the presence indicator is positive at step 366; or in implementations in which only positive presence indicators are received at step 364 and step 366 is skipped; then in some implementations at step 368, the measurement device may measure the strength of the signal from the remote control. The signal strength may be measured by a wireless receiver and/or signal analyzer of the audience measurement device, as discussed above. At step 370, the measurement device may determine whether the strength of the signal from the remote control is above a threshold z. If not, then the measurement device may determine that the remote control is likely not in the same location as the measurement device and display device, and therefore that its presence measurements are irrelevant or indicate the wrong location. For instance, if the portable device and remote control are in another room, the remote control may have a high signal strength reading, while being far from the audience measurement device. Accordingly, at step 358, the measurement device may determine that the portable device is likely not in the same location as the measurement device and corresponding media device, and infer that the panel member is not presently in the audience or consuming media from the media device.

If the strength of the signal from the remote control is greater than threshold z, then at step 372, the measurement device may identify the presence of the portable device (and infer the presence of the panel member, particularly in implementations in which the portable device transmits identification codes only when its sensors detect it is being worn, as discussed above). Identifying the presence of the portable device may comprise recording the presence of the portable device and/or corresponding panel member with a timestamp in a log, or recording an association of the panel member and/or portable device with a presently playing item of media output by the media device. At step 374, in some implementations, the audience measurement device may transmit the identification of presence of the portable device and/or panel member to a measurement service. In some implementations, transmission of the identification of presence of the portable device may also include transmitting an identification of a presently playing item of content on the media device; a channel to which the media device is tuned; metadata, closed captioning data, and/or embedded audio or video watermarks from the media device; or any other such information for the measurement service to identify the content likely consumed by the panel provider. In many implementations, step 374 may be performed periodically (e.g. once per hour, once per day, etc.) to reduce bandwidth, with measurement logs stored locally in memory of the audience measurement device.

Thresholds w, x, y, and z discussed above may be identical or may be different. For instance, if a panel member is typically closer to a remote control than an audience measurement device, then thresholds w or y may be set significantly higher than threshold x. Threshold z may be set higher than threshold x to guard against false positives when the remote control and portable device are together, equally distant from the audience measurement device, in another room (e.g. if the panel member carries the remote control when leaving the room). In implementations in which the remote control transmits via a different mechanism than the portable device (e.g. infrared vs. BTLE), this feature may not be utilized, or the signal thresholds may be unrelated or in different units.

As the systems and methods discussed herein utilize a measurement device 102 installed in series or parallel with a panel participant's media device 100 and a portable device 120 worn or carried by each panel participant, such panel participants must typically sign up or agree to participate in data collection. As only device identifiers may be transmitted from client capture devices in some implementations, privacy and anonymity of panel participants may be protected. To further enhance privacy, in some implementations, the device identifiers may be encrypted for transmission to the audience measurement server. Panel participants may also stop transmitting measurement data by removing a video input, network connection, and/or power connection from the measurement device, and may resume at any time by reattaching said connection or connections.

In some implementations, the panel participant may be provided with an opportunity to control whether or how to transmit measurement data to the audience measurement server. The measurement device may be configured to be disabled during certain times of day or with certain program material (e.g. specified channels, or responsive to the presence of specified V-chip parental rating codes embedded within the video). Thus, the panel participant may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client " or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A remote control for audience presence detection, comprising:
    a wireless receiver configured to receive a first signal from a portable device of an audience member, the first signal including an identifier of the portable device;
    a signal analyzer configured to measure a strength of the first signal and generate an identification of the strength of the first signal as measured by the signal analyzer; and
    a wireless transmitter configured to: transmit, to a measurement device, a second signal comprising the identifier of the portable device received by the wireless receiver and the identification generated by the signal analyzer of the strength of the first signal, the measurement device including a presence engine configured to identify the portable device as present, responsive to a determination that (i) the identification of the strength of the first signal transmitted from the portable device to the remote control as measured by the signal analyzer exceeds a first threshold, (ii) a strength of the second signal transmitted from the remote control to the measurement device exceeds a second threshold, and (iii) a strength of the first signal transmitted from the portable device to the measurement device exceeds a third threshold.

2. The remote control of claim 1, wherein the signal analyzer further comprises a comparator configured to compare the measured strength of the first signal of the portable device of the audience member to a threshold; and
    wherein the wireless transmitter is configured to transmit the identification of the measured strength to the measurement device, responsive to the measured strength exceeding the threshold.

3. The remote control of claim 2, wherein the identification of the measured strength comprises an identification of presence of the portable device.

4. The remote control of claim 1, wherein the wireless transmitter is further configured to transmit an identifier of the remote control to the measurement device.

5. The remote control of claim 1, wherein the remote control and the measurement device are both associated with a media device.

6. The remote control of claim 1, wherein the remote control further comprises a transmitter configured to transmit a control command to a media device.

7. A measurement device for audience presence detection, comprising:
    a wireless receiver configured to receive:
        a first signal from a portable device of an audience member, and
        a second signal from a remote control, the second signal comprising an identification of a strength of the first signal measured by a first signal analyzer of the remote control, and transmitted responsive to the measurement, by the first signal analyzer, of the strength of the first signal;
    a second signal analyzer configured to measure a strength of the received first signal and a strength of the received second signal; and
    a presence engine configured to identify the portable device as present, responsive to a determination that (i) a strength of the first signal transmitted from the portable device to the wireless receiver exceeds a first threshold, (ii) a strength of the second signal transmitted from the remote control to the wireless receiver exceeds a second threshold, and (iii) the identification of the strength of the first signal transmitted from the portable device to the remote control as measured by the first signal analyzer of the remote control exceeds a third threshold.

8. The measurement device of claim 7, wherein the second signal analyzer further comprises a comparator for comparing (i) the strength of the first signal to the first threshold and (ii) the strength of the second signal to the second threshold.

9. The measurement device of claim 7, wherein the identification of the strength of the first signal measured by the remote control comprises a positive presence identification.

10. The measurement device of claim 7, wherein the identification of the strength of the first signal measured by the remote control comprises a signal strength measurement value.

11. The measurement device of claim 7, further comprising a communications interface configured to transmit an identification of presence of the portable device to a measurement service, responsive to the identification of the portable device as present.

12. The measurement device of claim 7, wherein the remote control and measurement device are both associated with a media device.

13. The measurement device of claim 12, further comprising a program detector configured to record an identification of an item of content output by the media device.

14. A method for audience presence detection, comprising:
    receiving, by a wireless receiver of a measurement device:
        a first signal from a portable device of an audience member, and
        a second signal from a remote control, the second signal comprising an identification of a strength of the first signal measured by a first signal analyzer of the remote control, and transmitted responsive to the measurement, by the first signal analyzer, of the strength of the first signal;

measuring, by a second signal analyzer of the measurement device, a strength of the received first signal and a strength of the received second signal; and identifying, by a presence engine of the measurement device, the portable device as present, responsive to a determination that (i) the strength of the first signal transmitted from the portable device to the wireless receiver exceeds a first threshold, (ii) the strength of the second signal transmitted from the remote control to the wireless receiver exceeds a second threshold, and (iii) the identification of the strength of the first signal transmitted from the portable device to the remote control as measured by the first signal analyzer of the remote control exceeds a third threshold.

15. The method of claim 14, further comprising comparing, by the second signal analyzer, (i) the strength of the first signal to the first threshold and (ii) the strength of the second signal to the second threshold.

16. The method of claim 14, wherein the identification of the strength of the first signal measured by the remote control comprises a positive presence identification.

17. The method of claim 14, wherein the identification of the strength of the first signal measured by the remote control comprises a signal strength measurement value.

18. The method of claim 14, further comprising transmitting, by a communications interface of the measurement device, an identification of presence of the portable device to a measurement service, responsive to the identification of the portable device as present.

19. The method of claim 14, wherein the remote control and measurement device are both associated with a media device.

20. The method of claim 19, further comprising recording, by a program detector of the measurement device, an identification of an item of content output by the media device.

21. The method of claim 14, wherein the measurement device is associated with a media device in a first location, and further comprising:

receiving, by a wireless receiver of a second measurement device associated with a second media device in a second location, the first signal from the portable device of the audience member, and a third signal from a second remote control, the third signal comprising an identification of a strength of the first signal measured by the second remote control;

measuring, by a signal analyzer of the second measurement device, a strength of the received first signal at the second measurement device and a strength of the received third signal; and identifying, by a presence engine of the second measurement device, the portable device as not present at the second location, responsive to a determination that (i) the strength of the first signal transmitted from the portable device to the wireless receiver of the second measurement device exceeds the first threshold, (ii) the strength of the third signal transmitted from the second remote control to the wireless receiver of the second measurement device exceeds the second threshold, and (iii) the identified strength of the first signal transmitted from the portable device to the second remote control as measured by the second remote control does not exceed the third threshold.

22. The remote control of claim 1, wherein the presence engine is configured to identify the portable device as present responsive to a determination that a second measured strength of the second signal exceeds a second threshold.

23. The remote control of claim 1, wherein the presence engine is further configured to identify the portable device as present responsive to a determination that a difference in the identification of the strength of the first signal transmitted from the portable device to the remote control as measured by the signal analyzer and the strength of the first signal transmitted from the portable device to the measurement device exceeds a fourth threshold.

24. The measurement device of claim 7, wherein the presence engine is further configured to identify the portable device as present responsive to a determination that a difference in the strength of the first signal transmitted from the portable device to the wireless receiver and the identification of the strength of the first signal transmitted from the portable device to the remote control exceeds a fourth threshold.

* * * * *